United States Patent [19]

Yamaguchi et al.

[11] Patent Number: 4,896,258
[45] Date of Patent: Jan. 23, 1990

[54] DATA PROCESSOR PROVIDED WITH INSTRUCTIONS WHICH REFER TO BOTH TAGGED AND TAGLESS DATA

[75] Inventors: Shinichiro Yamaguchi; Hidekazu Matsumoto, both of Hitachi; Tadaaki Bandoh, Naka; Hiroaki Nakanishi, Hitachi; Kenzi Hirose, Hitachi; Takao Kobayashi, Hitachi; Yoshihiro Miyazaki, Hitachi, all of Japan

[73] Assignees: Hitachi, Ltd.; Hitachi Engineering Co., Ltd., both of Tokyo, Japan

[21] Appl. No.: 881,407

[22] Filed: Jul. 2, 1986

[30] Foreign Application Priority Data

Jul. 4, 1985 [JP] Japan .............................. 60-145831
Jul. 8, 1985 [JP] Japan .............................. 60-148301

[51] Int. Cl.⁴ .............................................. G06F 9/34
[52] U.S. Cl. .................................................. 364/200
[58] Field of Search ... 364/200 MS File, 900 MS File

[56] References Cited

U.S. PATENT DOCUMENTS 4,212,058  7/1980  Gunawardena ................... 364/200
4,241,396 12/1980  Mitchell et al. ................... 364/200
4,751,638  6/1988  Azuma ............................... 364/200

OTHER PUBLICATIONS

Tick, E. et al., "Towards a Pipelined Prolog Processor", IEEE, 1984, pp. 29–40.
Ungar, D. et al., "Architecture of SOAR: Small talk on a RISC," IEEE, 1984, pp. 188–197.
Moor, D. A., "Architecture of the Symbolics 3600," The 12th Annual Int'l Symposium on Computer Architecture, Jun. 1985, pp. 76–83.

Primary Examiner—David L. Clark
Attorney, Agent, or Firm—Antonelli, Terry & Wands

[57] ABSTRACT

A data processor for execution of tagged data and tagless data has a decoder for discriminating whether the data is tagged or tagless one and in case of a tagged data, separates a tag part and uses the remaining part for address computation. The data processor also comprises a unit for evaluating the tag part and a micro program controller for multi-branching in accordance with the evaluation result of the tag part. The tag evaluating unit includes an extender eliminating part for extracting the tag part from data on a data bus, a plurality of tag part storing registers for storing the tag part from the eliminating part under the control of the micro program controller, and a tag multi-way jump encoder for generating a tag multi-way jump address to feed it to the controller on the basis of the outputs of the registers and a signal from the micro program controller, thereby enabling tag multi-way jump.

21 Claims, 28 Drawing Sheets

FIG. 4

| NO | CONTENT | FORMAT | ABBREV. |
|---|---|---|---|
| 1 | NILL | TAG: `1111 0001` / DON'T CARE (bits 31 28 27 24 23 16 15 0) | NIL |
| 2 | VARIABLE | TAG: `1111 0010` / VARIABLE NO. | VAR |
| 3 | ATOM | TAG: `1111 0011` / ATOM NO. | ATM |
| 4 | SHORT-INTEGER | TAG: `1111 0100` / DON'T CARE / 16 BIT INTEGER | WORD |
| 5 | LONG-INTEGER | TAG: `0001` / POINTER | LONG |
| 6 | BIG NUMBER | TAG: `0010` / POINTER | BNUM |
| 7 | DOUBLE-FLOATING | TAG: `0011` / POINTER | DBL |
| 8 | REFERENCE | TAG: `0100` / POINTER | REF |
| 9 | STRUCTURE | TAG: `0101` / POINTER | STR |
| 10 | LIST | TAG: `0110` / POINTER | LST |
| 11 | UNDEFINE | TAG: `0111` / POINTER | UNDF |

INSTRUCTION TYPE

| SZ | MOD | | | REG NO. | | | | DESCRIPTION |
|---|---|---|---|---|---|---|---|---|
| 7 | 6 | 5 | 4 | 3 | 2 | 1 | 0 | |
| 0 | 0 | 0 | 0 | \multicolumn{4}{c\|}{RNO} | ERn |
| 0 | 0 | 0 | 1 | \multicolumn{4}{c\|}{RNO} | ARn |
| 0 | 0 | 1 | 0 | \multicolumn{4}{c\|}{RNO} | (ARn) |
| 0/1 | 0 | 1 | 1 | \multicolumn{4}{c\|}{RNO} | (ARn)+ |
| 0/1 | 1 | 0 | 0 | \multicolumn{4}{c\|}{RNO} | −(ARn) |
| 0/1 | 1 | 0 | 1 | \multicolumn{4}{c\|}{RNO} | d(ARn) |
|  | 1 | 1 | 0 |  |  |  |  |  |
| 0/1 | 1 | 1 | 1 | 0 | 0 | 0 | 0 | ABSOLUTE |
| 0/1 | 1 | 1 | 1 | 0 | 0 | 0 | 1 | IMMEDIATE |
| 0/1 | 1 | 1 | 1 | 0 | 1 | 0 | 1 | d(PC) |
|  | 1 | 1 | 1 | 0 | 1 | 1 | 0 |  |
| 0 | 1 | 1 | 1 | 0 | 1 | 1 | 1 | td(PC) |

RNO : 0000～1111
TYPE OF EA

FIG. 8
(h) 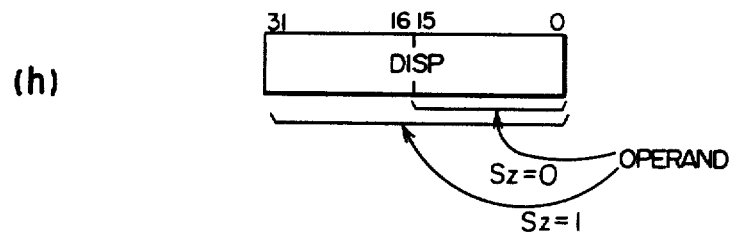
(i) 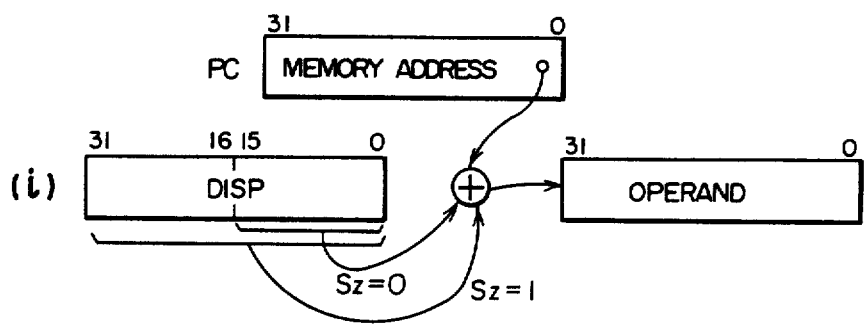
(j) 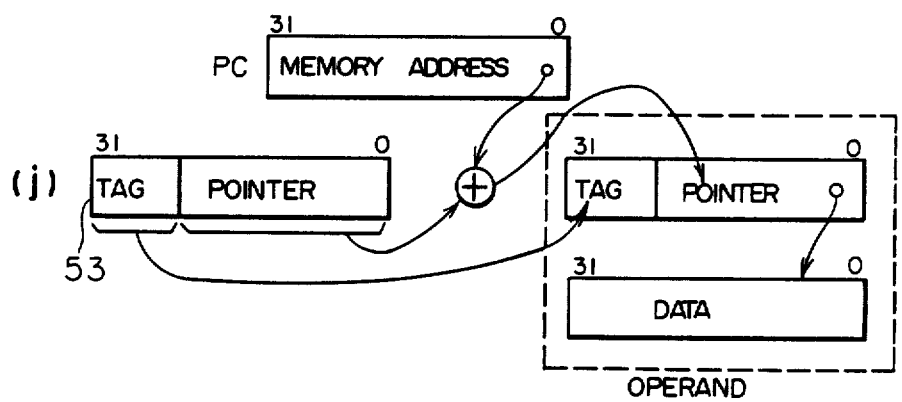

FIG. 23 (A)

| TEST PATTERN | | | | TAG 1 | TAG 2 | OFFSET |
|---|---|---|---|---|---|---|
| 0 | 0 | 0 | 0 | NIL | — | 0 |
| { | { | { | { | UNDF | — | 1 |
| } | } | } | } | OTHERS | — | 2 |
| 0 | 0 | 0 | 1 | STR | — | 0 |
| { | { | { | { | UNDF | — | 1 |
| } | } | } | } | OTHERS | — | 2 |
| 0 | 0 | 1 | 0 | LST | — | 0 |
| { | { | { | { | UNDF | — | 1 |
| } | } | } | } | OTHERS | — | 2 |
| 0 | 0 | 1 | 1 | REF | — | 0 |
| { | { | { | { | UNDF | — | 1 |
| } | } | } | } | OTHERS | — | 2 |
| 0 | 1 | 0 | 0 | UNDF | UNDF | 0 |
| { | { | { | { | UNDF | NOT UNDF | 1 |
| { | { | { | { | NOT UNDF | UNDF | 2 |
| } | } | } | } | NOT UNDF | NOT UNDF | 3 |
| 0 | 1 | 0 | 1 | LST | LST | 0 |
| { | { | { | { | NIL | NIL | 1 |
| { | { | { | { | OTHERS | — | 2 |
| } | } | } | } | — | OTHERS | 2 |

| TEST PATTERN | | | | TAG 1 | TAG 2 | OFFSET |
|---|---|---|---|---|---|---|
| 0 | 1 | 1 | 0 | STR | STR | 0 |
| | | | | LST | LST | 1 |
| | | | | OTHERS | — | 2 |
| | | | | — | OTHERS | 2 |
| 0 | 1 | 1 | 1 | LST | NOT LST | 0 |
| | | | | NOT LST | LST | 0 |
| | | | | STR | NOT STR | 1 |
| | | | | NOT STR | STR | 1 |
| | | | | OTHERS | — | 2 |
| | | | | — | OTHERS | 2 |

| TEST PATTERN | | | | TAG 1 | TAG 2 | OFFSET |
|---|---|---|---|---|---|---|
| 1 | 0 | 0 | 0 | UNDF | — | 0 |
| | | | | ATM | ATM | 1 |
| | | | | WORD | WORD | 1 |
| | | | | LONG | LONG | 2 |
| | | | | DBL | DBL | 3 |
| | | | | BNUM | BNUM | 4 |
| | | | | WORD | LONG | 5 |
| | | | | LONG | WORD | 6 |
| | | | | WORD | BNUM | 7 |
| | | | | BNUM | WORD | 8 |
| | | | | LONG | BNUM | 9 |
| | | | | BNUM | LONG | 10 |
| | | | | OTHERS | — | 11 |
| | | | | — | OTHERS | 11 |

423　　436　　437　　424

FIG. 25
(a)
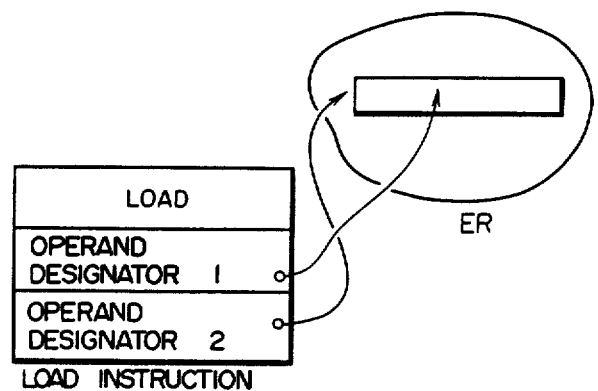
(b)
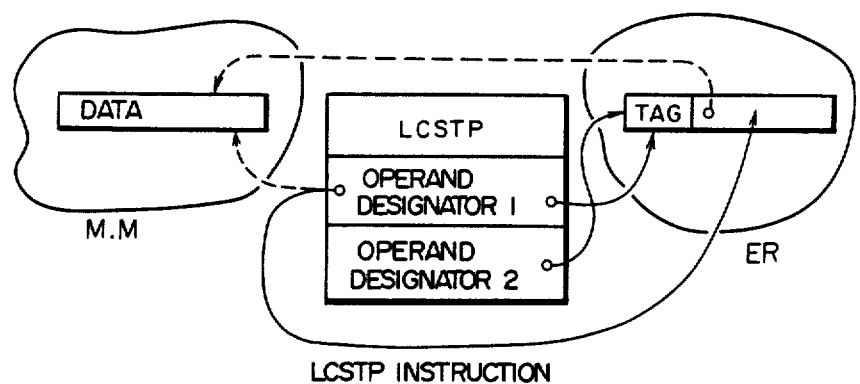

FIG. 26
(a) 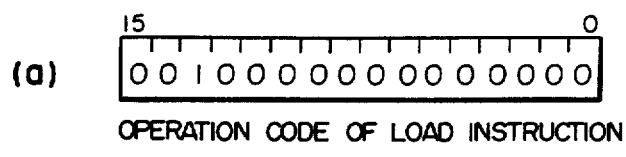
OPERATION CODE OF LOAD INSTRUCTION
(b) 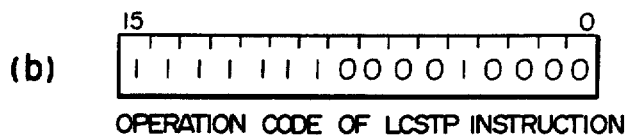
OPERATION CODE OF LCSTP INSTRUCTION
FIG. 27
(a) 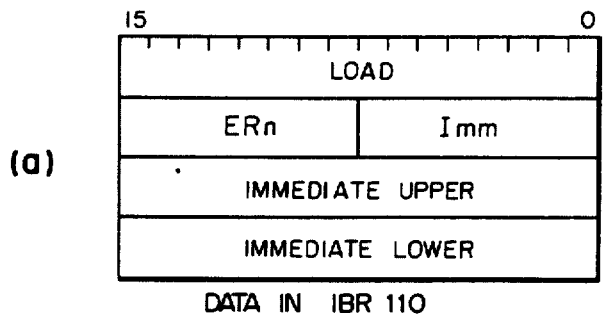
DATA IN IBR 110
(b) 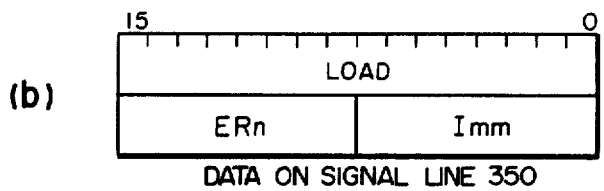
DATA ON SIGNAL LINE 350
(c) 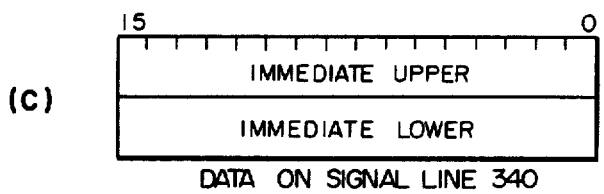
DATA ON SIGNAL LINE 340
(d) 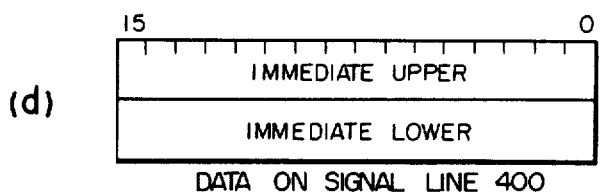
DATA ON SIGNAL LINE 400

DATA PROCESSOR PROVIDED WITH INSTRUCTIONS WHICH REFER TO BOTH TAGGED AND TAGLESS DATA

BACKGROUND OF THE INVENTION

The present invention relates to a data processor for interpreting and executing an instruction having a tag indicating a data type and an instruction having no tag.

A Neumann type general purpose data processor (which will be called a "computer") has a macro instruction (which will be hereinafter simply called an "instruction") intrinsic thereto, and the instruction is usually composed of an operation code indicating the kind of operation and an operand designator indicating the location of an operand to be operated on. And, the operand designating method is called an "addressing mode", for which a variety of methods have been proposed Those computers are commonly featured by the fact that the type of data to be handled by an instruction is uniquely determined by the operation code. For example, even data existing in the same operand is computed for a fixed point instruction by deeming the data as an integer and for a letter instruction by deeming the data as a letter code.

In a computer dedicated to prolog, as described in "Hardware Development of Personal Sequential Type Inference Machine PSI" in the Proceedings of the Logic Programming Conference '84, on the contrary, a specified bit of each data is assigned a tag so that this tag is given information about the data type of that data. In operation, the kind of computation is changed while the data type is judged by examining the tag. This tag architecture can efficiently execute a symbol processing language.

The two kinds of computer architectures described above are independent of and contradictory to each other. In an application such as an intelligence engineering, however, both the numerical processing, which is the strong point of the former, and the non-numerical processing, which is the strong point of the latter, are required and so that there is a need for a computer which can execute either of these two processings. On the other hand, the advent of a logical data processor has been desired which is suitable for processing tag parts added to data in order to identify attributes of that data upon execution of such a predicate logical language as prolog.

Although a procedure-oriented language system as is represented by "FORTRAN" has its procedure and data separated, a logical language such as prolog is processed by evaluating data. In order to efficiently execute such logical language, therefore, there are attached to all of the data fields, i.e., tag parts, for indicating the attributes (e.g., variables, constants or structures) of the data. Thanks to the concentration of the data attributes at the tag parts, the language processing system is able to perform processing by evaluating the tag parts only, thereby to improve the processing efficiency of the logical language.

Incidentally, evaluation of the tag parts is conducted by examining the tags of the data in a memory read data buffer (DR), as in the paper entitled "Hardware Design of Personal Sequential Type Inference Machine PSI" and collected in the "Proceedings of THE LOGIC PROGRAMMING CONFERENCE '84" concerning the machine ψ, which was published in 1984 from the Institute of New-Generation Computer Technique Development (which is abbreviated into "ICOT"). According to this structure, however, the content in a memory read buffer is renewed if the memory is read. In order to latch a tag to be judged, therefore, operations are required for transferring the contents of a data register to a work file and for reading out again, as necessary, the contents from the work file into the data register. This prolongs the processing time period in case it is necessary to judge a plurality of tags. Since the tags have their bit length fixed at 6 bits, moreover, there arises another defect that the tags cannot be extended.

SUMMARY OF THE INVENTION

An object of the present invention is to provide a data processor which can execute instructions for both tagless and tagged data.

Another object of the present invention is to provide logical data processor which can judge a plurality of tags at a high speed and can easily extend them.

In order to interpret and execute the instructions for both tagless and tagged data in a computer, there can be conceived a method by which the two types of instructions are grouped into instruction sets of different modes and each instruction set is given an instruction for shifting to the other mode. However, the overhead cannot be ignored for frequent mode shifts. In the present invention, therefore, the two types of instructions can be discriminated by giving a bit to an operation code, which bit indicates whether or not the instruction handles tagged data, and by providing an instruction decoder with means for judging it.

If it is intended to store the tagless and tagged data in the same computer, on the other hand, it is necessary to make equal the word lengths of the two. In the case of a 32-bit machine, for example, the data takes such a padding type as shown in FIG. 4 as will be described later. Here, the data of 32-bit length has to be extracted to the outside by means of a pointer as shown at (C) in FIG. 3. In order to make relocatable a program module including that data type as a constant, the value of the pointer cannot be an absolute address, but is to be a PC (i.e., Program Counter) relative value or a base register relative value.

In the instruction for the tagged data having that data type as an immediate data, therefore, a correct pointer value may be calculated by adding the PC or base register value to the pointer when computing an address. For this computation, according to the present invention, there is provided an addressing mode which can be allowed only for the instruction for the tagged data, as described above. In addition, according to the present invention, where data from a memory includes is added with an extender, the extender is removed from the data and a tag part is saved and stored in a register.

BRIEF DESCRIPTION OF THE DRAWINGS

FIG. 4 is a diagram showing specific examples of the tagged data;

FIG. 23 illustrates at sections (A) through (C) logical diagrams to be used for explaining the operation of a tag judging circuit shown in FIG. 1;

FIG. 25 illustrates at sections (a) and (b) specific execution of the instructions;

FIG. 26 shows at sections (a) and (b) a specific embodiment of the operation codes of the instructions to be used in the present invention;

FIG. 27 shows at sections (a) through (d) the data occurring at various points useful for explaining the example of executing the tagless data instructions according to the present invention;

DESCRIPTION OF THE PREFERRED EMBODIMENTS

The invention will now be described by way of example with reference to the accompanying drawings.

Figure 2:
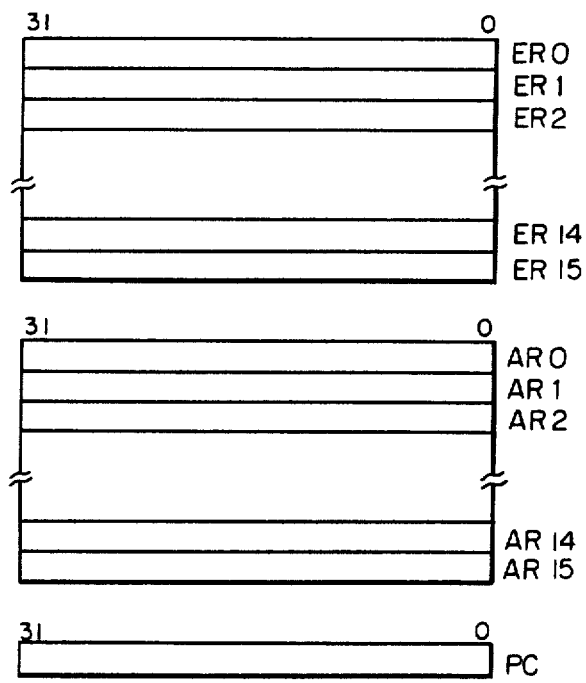
FIG. 2 is a diagram for explaining general purpose registers to be used in the present invention.

Among registers in a tagged data processor (hereinafter referred to as a computer), registers which can be designated as operands by a macro instruction of the computer are shown in FIG. 2. There are thirty-three registers each of which has a width of 32 bits. Excepting a program counter PC, the remaining registers ER0 to ER15 and AR0 to AR15 are so-called general purpose registers. The number of the registers is not essential for the present invention, but the description will proceed assuming here that there are thirty-three registers.

Figure 3:
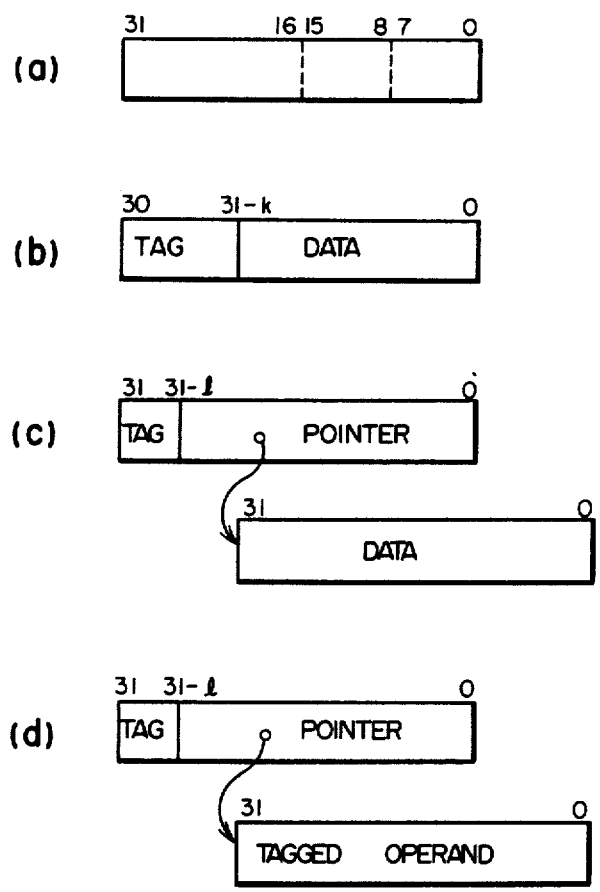
FIG. 3 illustrates at sections (a) through (d) data types to be used in the present invention.

FIG. 3 shows the data types to be used in the computer, and the length of a basic word is 32 bits.

FIG. 3 shows at section (a) tagless data which is frequently used in the ordinary computer. FIG. 3 shows at section (b) a first tagged data having a tag of k bits indicative of a data type and data of (31−k) bits which are padded in one word. In the present invention, the bit length of the tag is not essential and this example shown at (b) in FIG. 3 will be described by assuming k=8. FIG. 3 shows at (c) a second tagged data, in which the first 32 bits (which will be called a "pointer word") are made up of a tag of l bits indicating a data type of the data body and a memory address (or pointer) of (31−l)) bits for the data body. Thus, the data is present in a memory location indicated by the pointer. In the present invention, the bit length of the tag is not essential, as has been described above, and the description will proceed assuming l=4 in this example. On the other hand, the data designated by the pointer need not have 32 bits, but may be of 64 bits or more in the present invention. FIG. 3 shows at (d) a third tagged data having a pointer word in which are stored a tag of l bits and a pointer of (31−l) bits for the first, second or third tagged data.

FIG. 4 shows specific examples of the tagged data. Examples Nos. 1 to 4 respectively having contents "nil", "variable", "atom" and "short-integer" are directed to the first tagged data; examples Nos. 5 to 7 respectively having contents "long-integer", "big-number" and "double-floating" are directed to the second tagged data; and examples Nos. 8 to 11 respectively having contents "reference", "structure", "list" and "undefine" are directed to the third tagged data. In the above examples Nos. 5 to 7 directed to the second tagged data and examples Nos. 8 to 11 directed to the third tagged data, the upper four bits are used for a tag part and the remainder of bits is used for a data. The 4-bit tag part is termed an ordinary tag.

In the above examples Nos. 1 to 4 directed to the first tagged data, a pattern "1111" of the upper four bits is used as an extender of an extended tag and the following four bits are used for a tag part. The ordinary tag is used, as herein described, for a data of a long bit length and the extended tag is used for a data of a short bit length to thereby extend the tag. Since the tag bit length may be increased or decreased, as has been described hereinbefore, it is easy to introduce a new data type.

Figures 5, 6:
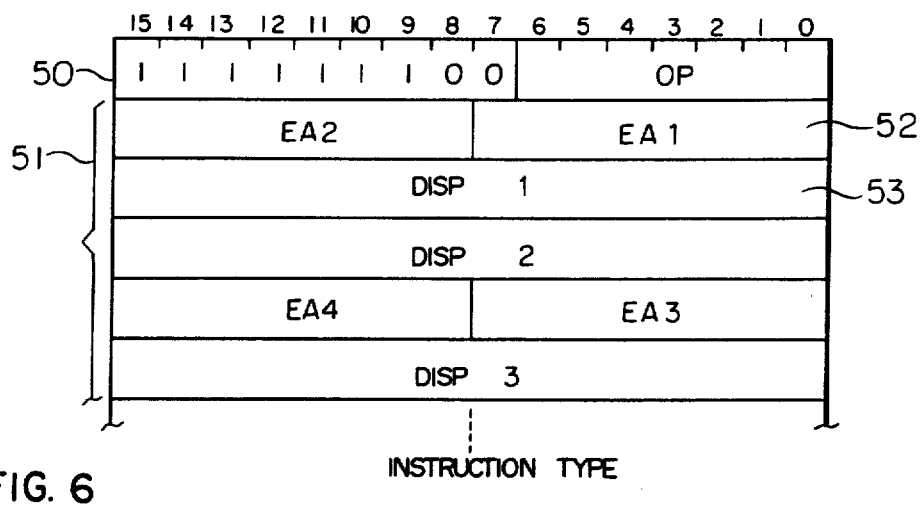
FIG. 5 is a diagram showing a format of an instruction executable in the present invention.
FIG. 6 is diagram showing details of addressing modes to be used for explaining FIG. 5.

FIG. 5 shows the format of an instruction which is executable by the computer of the present embodiment. The instruction is composed of an operation word 50 (which will be abbreviated to "OPW") of 16 bits, and an operand designator or specifier 51 (which will be abbreviated to "OPS") of 16 bits or more indicating the location of an operand to be operated on.

The OPW 50 has at least a field OP indicating the kind of the operation and a field indicating whether or not the instruction can handle the tagged data. In this embodiment, the instruction having the upper 9 bits "111111100" in the OPW 50 can handle the tagged data, and the operation for this is indicated by the lower 7 bits in the OPW 50. The OPS 51 is composed of a mode designator EA 52 indicating an addressing mode, and a displacement DISP 53 to be used in address computation.

FIG. 6 shows details of the EA 52, and the procedures for computing the operand address in each addressing mode will be described with further reference to FIGS. 7 and 8.

A mode MOD 55, when indicated at "000", "001" and "010", is called the "register direct and indirect" addressing modes, as is well known to those skilled in the art. The MOD 55 indicated at "011" is called the "auto increment" addressing mode. As shown at (d) in FIG. 8, a value 2 is added to a register denoted at REG NO 56 when Sz 54 takes 0, and a value 4 is added to the register REG NO 56 when Sz 54 takes 1. The MOD 55 indicated at "100+ is called the "auto decrement" addressing mode, in which the operation is reversed from the auto increment, as shown at (e) in FIG. 8.

Figure 7:
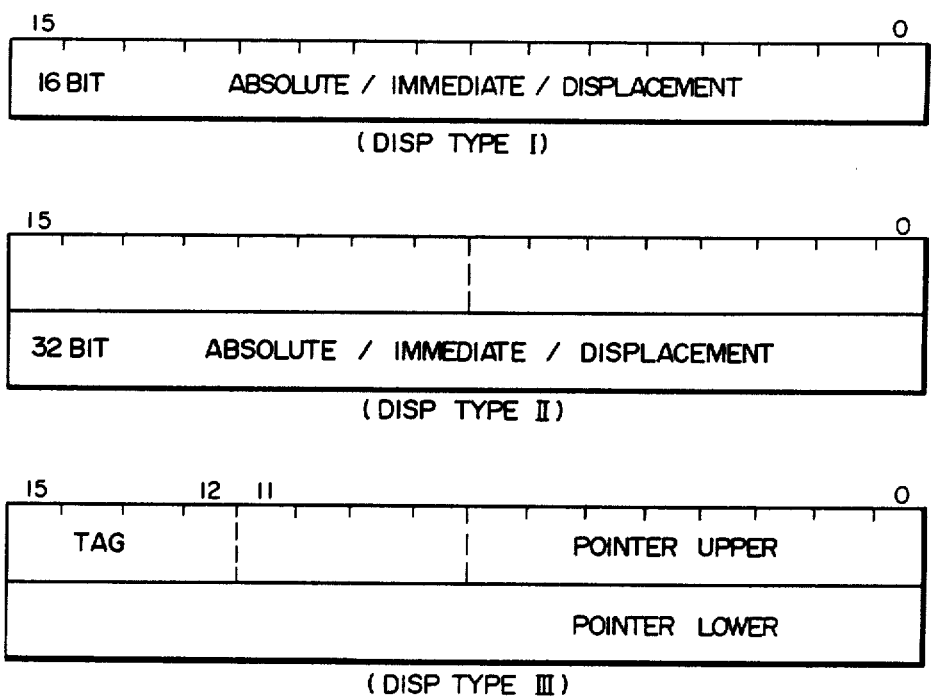
FIG. 7 is a diagram showing the types of displacement (disp) shown in FIG. 5.

The MOD 55 indicated at "101" is called the "register relativeness" addressing mode, in which the DISP 53 takes the disp type I of FIG. 7, when the Sz 54 is 0 (zero), and is added to the register denoted at REG NO 56. For Sz 54=1, on the other hand, the disp type II is added to calculate an operand address on the memory.

The addressing mode having the MOD 55 "111" and the REG NO 56 "0000" is called the "absolute". For Sz 54=0, as shown at (g) in FIG. 8, the DISP 53 takes the disp type I, which is used, as it is for the operand address on the memory. For Sz 54=1, on the other hand, the disp type II provides itself for the operand address on the memory.

The addressing mode having the MOD 55 "111" and the REG NO 56 "0001" is called the "immediate". For Sz 54=0, as shown at (h) in FIG. 8, the DISP 53 takes the disp type I of FIG. 7 which provides itself for the operand. For Sz=1, on the other hand, the disp type II provides itself for the operand.

Figure 8:
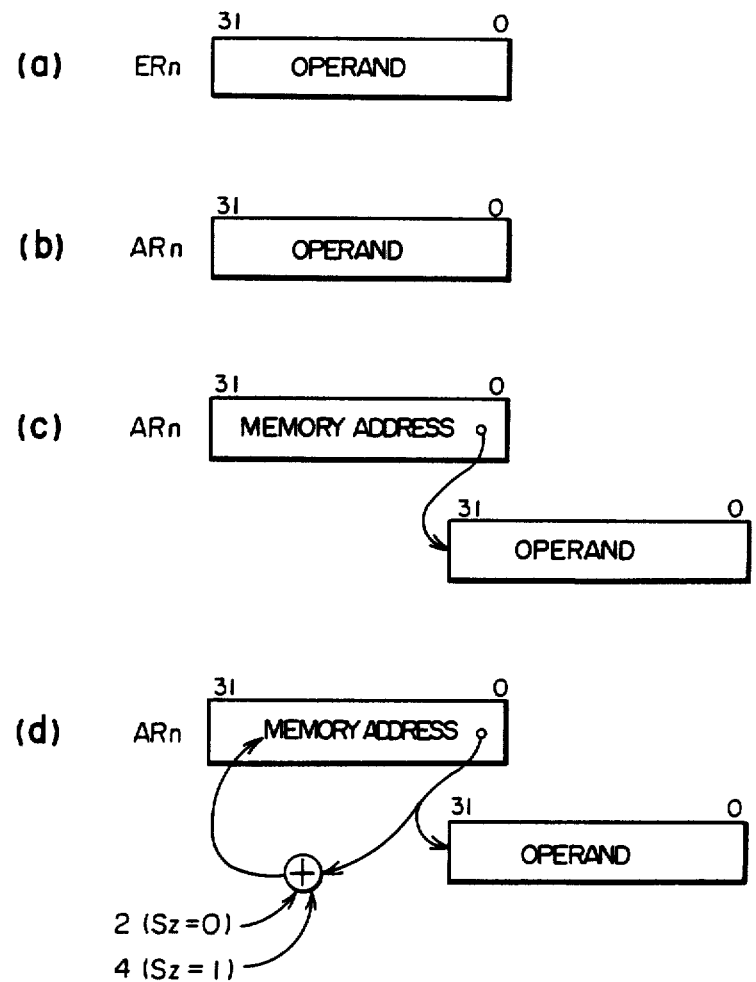
FIG. 8 illustrates at sections (a) through (j) details of the operands.
Figure 8:
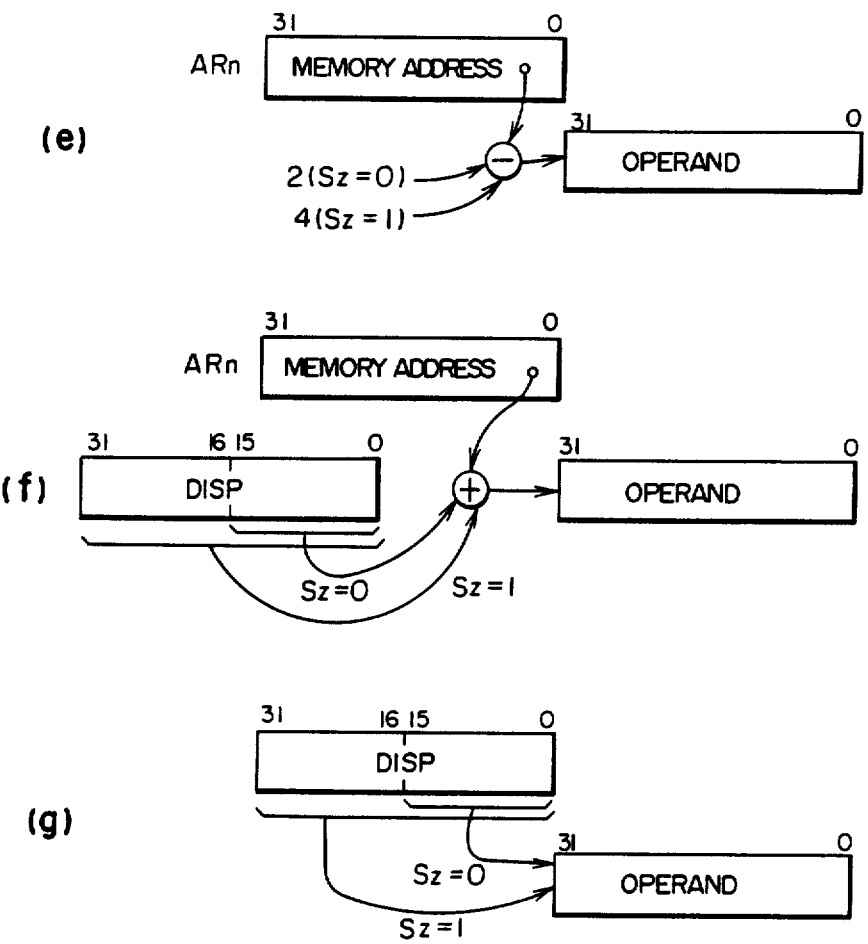

The addressing mode having the MOD 55 "111" and the REG NO 56 "0101" is called the "program counter relativeness" and takes an operand address calculating procedure similar to that of the register relativeness addressing mode, as shown at (i) in FIG. 8.

The addressing mode having the MOD 55 "111" and the REG NO 56 "0111" is specific to the present invention and is called the "tagged immediate addressing mode" in the present embodiment. In this tagged immediate addressing mode, as shown at (j) in FIG. 8, the DISP 53 takes the disp type III of FIG. 7, i.e., the type having a tag of 4 bits and a pointer of 28 bits, and the operand takes the second type, in which the pointer takes a sum of the 28-bit pointer and a value of the program counter, as shown in FIG. 3.

In the present embodiment, the register used in the tagged immediate addressing mode is described as limited to the program counter. It is apparent however that the aforementioned general purpose register or another register not described in the present embodiment can be used for the tagged immediate addressing mode.

Figure 9:
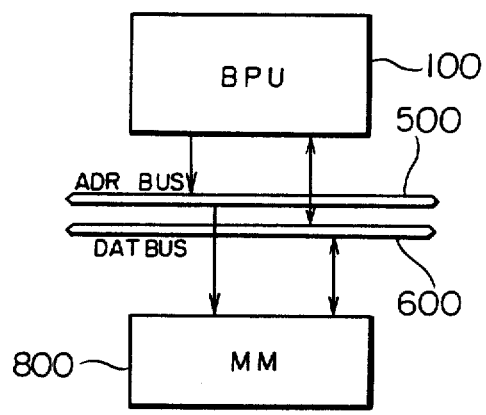
FIG. 9 is a diagram showing the overall construction of a computer to which the present invention is applied.

FIG. 9 shows the whole construction of the aforementioned computer which can execute both the instructions for the tagged data and the tagless data. Reference numeral 100 denotes an instruction executing unit (which will be referred to as "BPU") for interpreting and executing the aforementioned instructions. Numeral 800 denotes a memory unit (which will be referred to as "MM") for storing the aforementioned instructions or data. Numeral 500 denotes a memory address bus (which will be referred to s "ADRBUS") of 32-bit width, and numeral 600 denotes a memory data bus (which will be referred to as "DATBUS") of 32-bit width. Since the present invention is applied to the BPU 100, the internal construction of the BPU 100 will be described in detail in the following.

Figure 1:
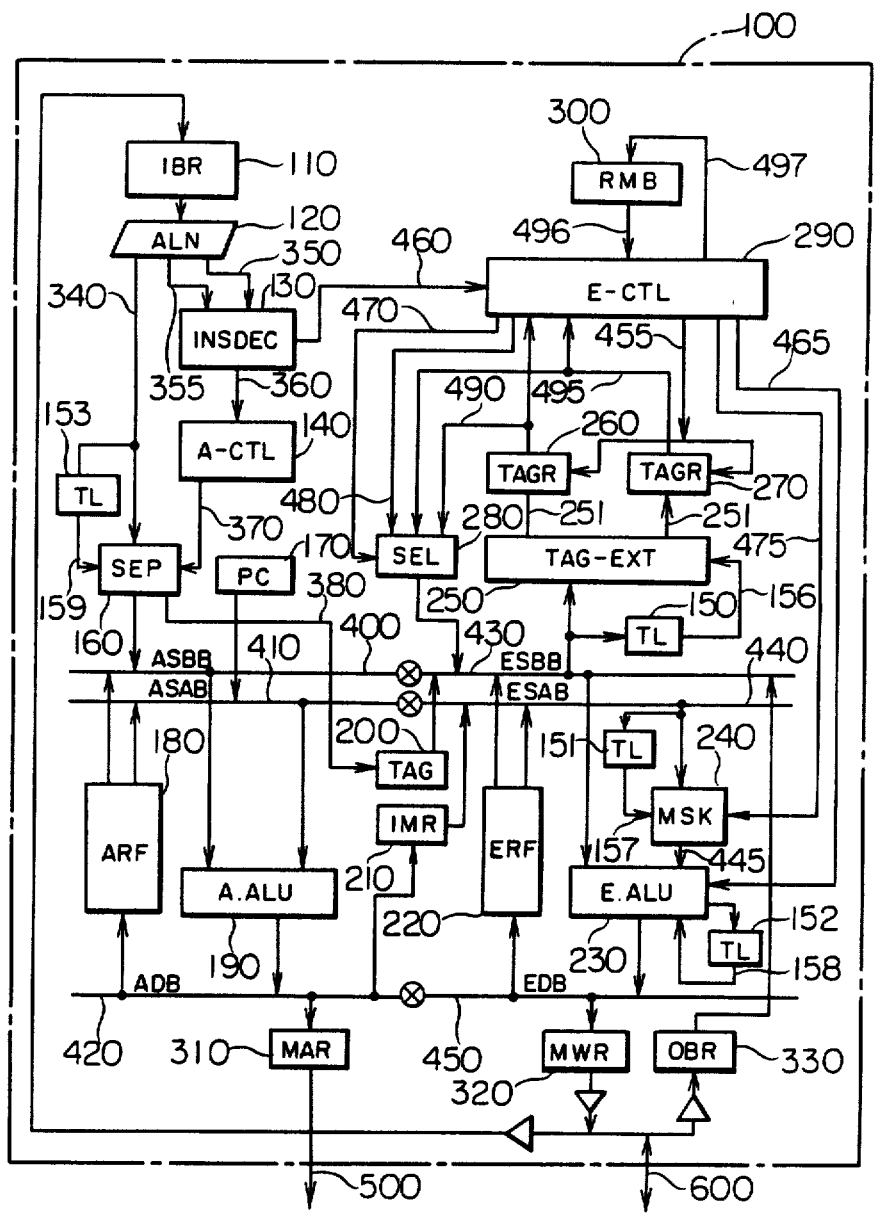
FIG. 1 is a block diagram showing the internal construction of a data processor according to one embodiment of the present invention.

FIG. 1 is a block diagram showing the internal construction of the BPU 100.

An instruction buffer register (IBR) 110 stores the instruction which has been fetched through the DATBUS 600 from the MM 800. An aligner (ALN) 120 stubs the OPW 50, the EA 52 and the DISP 53 from the instruction in the IBR 110 so that the OPW 50, the EA 52 and the DISP 53 are outputted to signal lines 350, 355 and 340, respectively.

An instruction decoder (INSDEC) 130 generates entry addresses for address computation and for instruction execution in accordance with information inputted from the signal lines 355 and 350 and delivers them out to signal lines 360 and 460, respectively. A control circuit (A-CTL) 140 is used for address computation having a function to set a signal line 370 at "1" when the tagged immediate addressing mode proceeds. The A-CTL 140 also generates control signals for a register file (ARF) 180 and an address computing arithmetic unit A-ALU) 190 in addition to the signal on signal line 370, but these control signals will not be described here because they are unnecessary for understanding the present invention.

A tag length detector (TL) 153 is provided to judge the length of the tag contained in the DISP 53 to set a signal line 159 at "1" for a tag of 8-bit length.

A separating circuit (SEP) 160 separates a tag and a pointer from the displacement on the signal line 340 to output the tag to a signal line 380 and a pointer part to a signal line 400 when both the signal lines 370 and 159 are at "1". Otherwise, the data on the signal line 340 is outputted as it is to the signal line 400.

A program counter (PC) 170 and a register file (ARF) 180, composed of physical registers AR0 to AR15, constitute a set of registers in FIG. 2. The arithmetic unit (A-ALU) 190 is used for address computation.

A register (TAG) 200 is provided to hold the tag stubbed by the (SEP) 160 and stores the tag of the operand in the tagged immediate addressing mode.

A register (IMR) 210 is provided to store, during the tagged immediate addressing mode, a new pointer which is obtained by adding the PC 170 and the pointer stubbed by the SEP 160. In the immediate mode, on the other hand, this register stores an immediate data. According to the present embodiment, the operand in the tagged immediate addressing mode is physically present in the pair of the TAG 200 and the IMR 210.

The register file (ERF) 220 physically has the registers ER0 to ER15 in FIG. 2 as mentioned hereinbefore.

An arithmetic unit (E-ALU) 230 has, in addition to the ordinary arithmetic and logical function, a function to cause a TL 152 to judge the length of a tag inputted from a signal line 430 when a signal line 465 is at "1", and to pad the tag in data inputted from a signal line 445 in accordance with the value of a signal lie 158 thereby to generate a tagged data.

When a signal line 475 is at "1", a data stubbing circuit 240 masks a tag of the tagged data inputted from an ESAB 440 in accordance with a result of judgement by a tag length detector TL 151 to output a data part to the signal line 445.

A stubbing circuit (TAG-EXT) 250 is operative to stub only a tag judged by a TL 150 from the tagged data inputted from the ESBB 430 to output the stubbed tag, as indicated at 251. The tag thus stubbed by the TAG-EXT 250 is stored in a tag register (TAGR) 260 when a signal line 455 is at "0", and in a tag register (TAGR) 270 when the signal line 455 is at "1". Details of the TAG-EXT 250 will be described later.

A selector (SEL) 280 selects one of the tags outputted from the TAGR 260, the TAGR 270 and the E-CTL 290 in accordance with a signal on a line 470 to output it to the upper eight bits of the ESBB 430.

A control circuit (E-CTL) 290 for execution of instructions generates control signals in accordance with a micro program control system.

A status flag (RMB) 300 is operative to indicate the state of the BPU 100, e.g., a read mode by "0" and a write mode by "1".

A memory address register (MAR) 310 for latching the address of the memory stores the operand address obtained by the address computation. The memory address register MAR stores the pointer of the pointer word when in the tagged immediate addressing mode.

A memory write data register (MWR) 320 latches data to be written in the MM 800 and an operand buffer register (OBR) 330 latches data read out of the MM 800.

The detailed description of the respective blocks necessary for understanding the present invention will now be given below.

Figure 10:
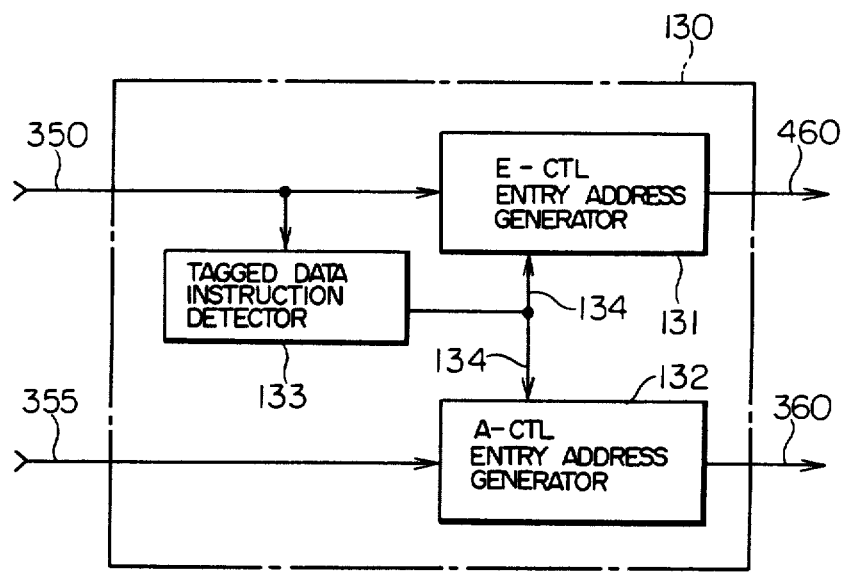
FIG. 10 is a block diagram showing one embodiment of an instruction decoder shown in FIG. 1.

The ISNDEC 130 takes the construction shown in FIG. 10, for example, and is equipped with at least means for detecting whether or not an instruction has tagged data. An entry address generator 131 responsive to an output signal on line 134 from a tagged data instruction detector 133 produces different entry addresses on the signal line 460 in accordance with the tagless data instruction and the tagged data instruction. On the other hand, an entry address generator 132 for the A-CTL generates an entry address for address computation in accordance with the EA 52 in the instructions. When the output signal line 134 is at "0", however, the tagged immediate addressing mode becomes an unusable addressing mode so that no entry address is generated.

Figure 11:
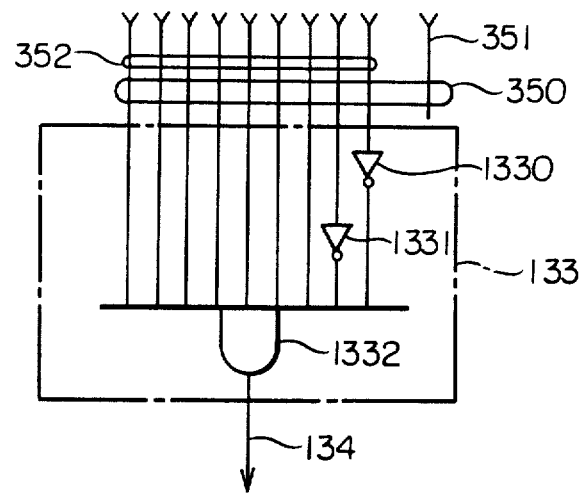
FIG. 11 is a circuit diagram showing one embodiment of a tagged data instruction detecting circuit 133 shown in FIG. 10.

The entry address generators 131 and 132 can be easily constructed, by those skilled in the art, with a programmable logic array (PLA) or the like. On the other hand, the tagged data instruction detector 133 can be exemplified by a circuit shown in FIG. 11 in the case of the present embodiment. In FIG. 11, a signal line 352 is for the upper 9 bits of the 16 bits in the OPW 50 of the instruction, whereas a signal line 351 is for the remaining bits. Numerals 1330 and 1331 denote NOT logics, and numeral 1332 denotes an AND logic. The signal line 134 takes "1" for the tagged data instruction and "0" for the other instructions.

Figure 12:
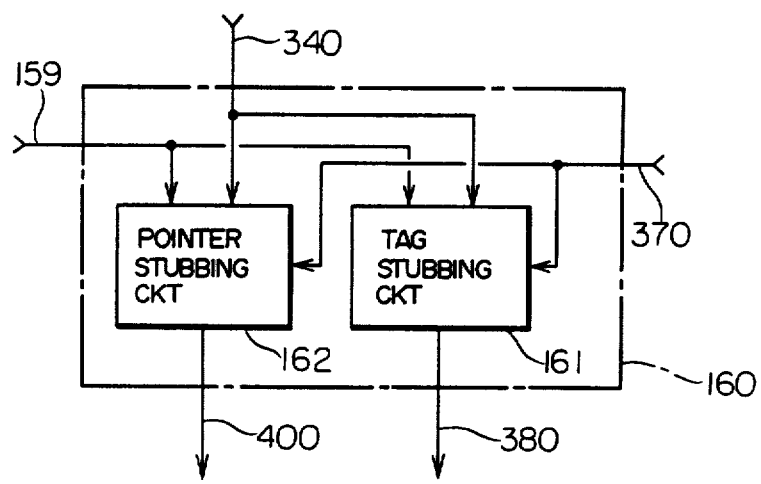
FIG. 12 is a block diagram showing one specific example of a tag-pointer separating circuit shown in FIG. 1.

The tag and pointer separating circuit SEP 160 takes the construction shown in FIG. 12 and separates the tag and the pointer from the displacement on the signal line 340, when the control signal 370 from the A-CTL 140 is at "1", to output them to the signal lines 380 and 400, respectively.

Figure 13:
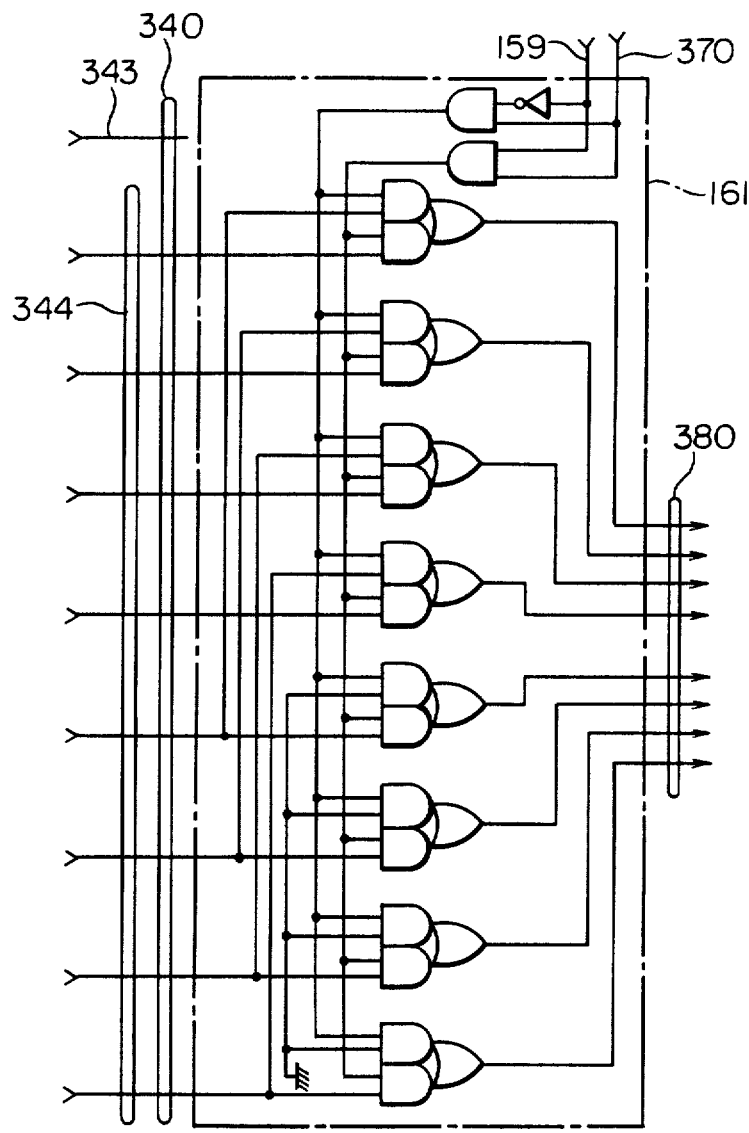
FIG. 13 is a circuit diagram showing one specific example of a tag stubbing circuit shown in FIG. 12.

Here, a tag stubbing circuit 161 can be constructed in the case of the present embodiment by a circuit shown in FIG. 13. In FIG. 13, the upper 8 bits on the signal line 340 are outputted to a signal line 344, and the tag is outputted to the signal line 380 when the signal line 370 is at "1".

Figure 14:
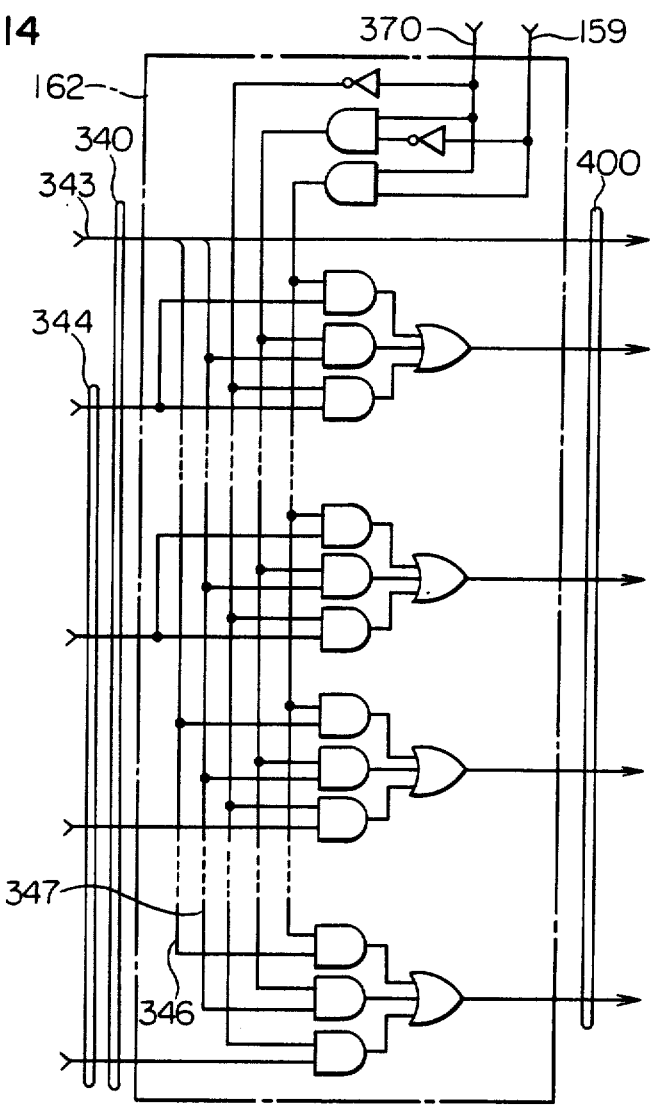
FIG. 14 is a circuit diagram showing one specific example of a pointer stubbing circuit shown in FIG. 12.

On the other hand, a pointer stubbing circuit 162 can be constructed in the case of the present embodiment by a circuit shown in FIG. 14. In FIG. 14, the lower 24 bits on the signal line 340 are outputted to a signal line 343, and the 28th and 24th bits of the signal line 340 are outputted to signal lines 346 and 347, respectively.

The pointer stubbing circuit 162 outputs a code extended data of the 24-bit- pointer to the ASBB 400, if the output of the TL 153 is at "1" when the signal line 370 is at "1", i.e., the 8-bit tag occurs and a code extended data of the 28-bit pointer to the ASBB 400 if the output of the TL 153 is at "0". If the signal line 370 is at "0", the value of the signal line 340 is outputted as it is to the ASBB 400.

Figure 15:
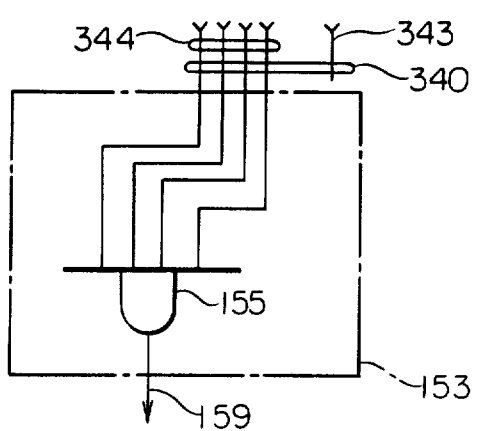
FIG. 15 is a circuit diagram showing one specific circuit of a tag length detecting circuit shown in FIG. 1.

The tag length detecting circuit TL 153 is for detecting whether the tag contained in the tagged data is 8 or 4 bits, and can be constructed in the case of the present embodiment by a circuit shown in FIG. 15. In FIG. 15, the signal line 344 receives the upper 4 bits of the signal line 340, which are ANDed by an AND logic 155. The TL 153 provides "1" on an output signal line 159, when the 8-bit tag, i.e., the upper 4 bits of the tagged data shown in FIG. 4 is expressed by "1111", and "0" for the 4-bit tag.

In the present embodiment, in addition to the TL 153, the tag length detecting circuits TL 150, TL 151 and TL 152 are also used which are identical to the TL 153 in their functions and internal constructions.

Figure 16:
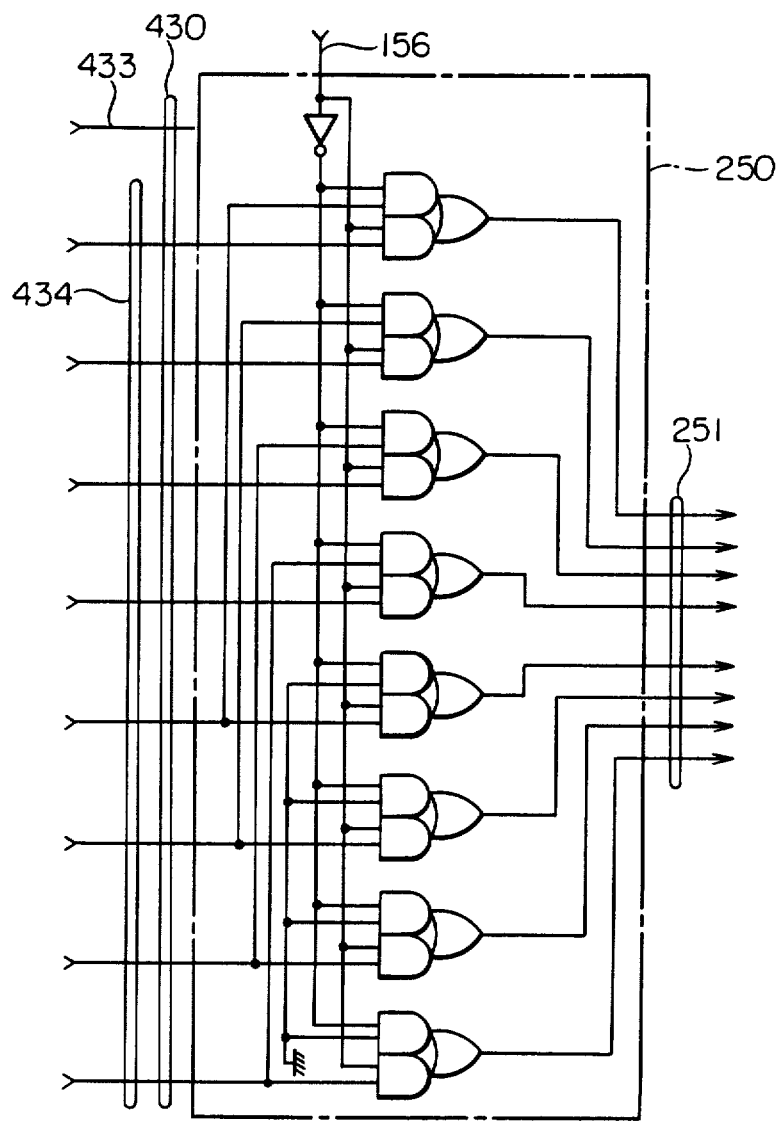
FIG. 16 is a circuit diagram showing one specific example of a tag stubbing circuit shown in FIG. 1.

The tag stubbing circuit TAG-EXT 250 can be constructed in the present embodiment by a circuit shown in FIG. 16. In FIG. 16, a signal line 434 receives the upper 8 bits of the ESBB 430 and in the case of the 8-bit tag, i.e., when the signal line 156 is at "1", the signal line 434 connects to the signal line 251 to provide the 8-bit tag. In the case of the 4-bit tag, i.e., when the signal line 156 is at "0", on the other hand, the signal line 251 receives, at the upper 4 bits, "0000" and, at the lower 4 bits, a tag.

Figure 17:
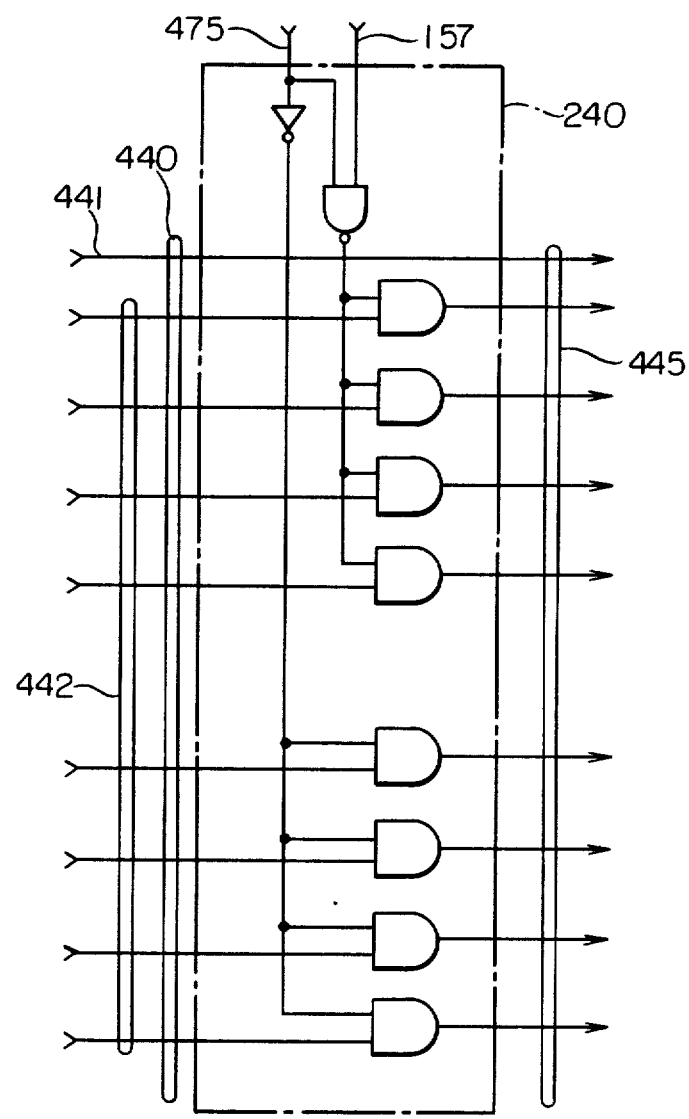
FIG. 17 is a circuit diagram showing one specific example of a data stubbing circuit shown in FIG. 1.

The data stubbing circuit MSK 240 can be constructed in the case of the present embodiment by a circuit shown in FIG. 17. In FIG. 17, a signal line 442 receives the upper 8 bits of the ESAB 440. If the output 157 of the TL 151 is at "1" when the data stubbing control signal 475 from the E-CTL 290 is at "1", i.e., the 8-bit tag occurs, there is outputted to the signal line 445 only the data part which has its upper 8 bits masked. If, at this time, the output 157 of the TL 151 is at "0", there is outputted to the output 445 the data part of 28 bits, which has only its upper 4 bits masked. If the signal line 475 is at "0", on the other hand, the data on the ESAB 440 is outputted as it is to the signal line 445.

Figure 18:
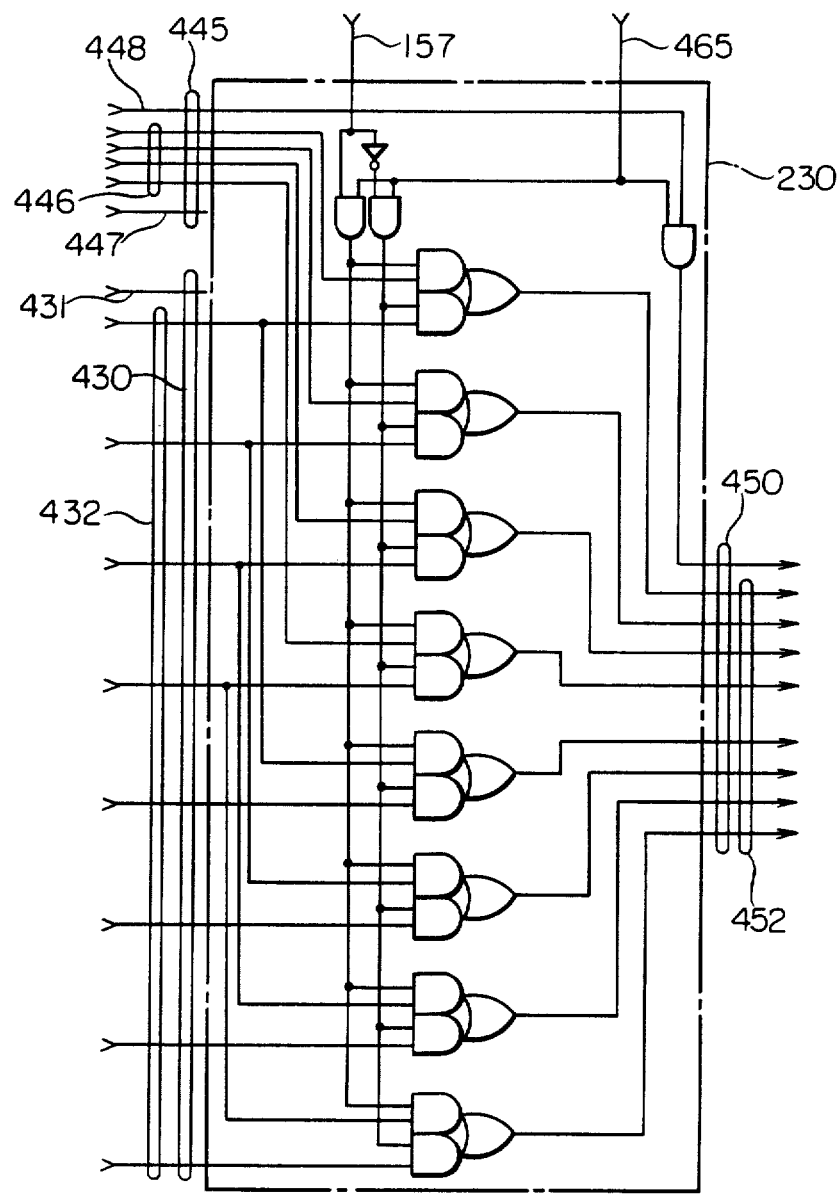
FIG. 18 is a circuit diagram showing one specific example of an arithmetic unit shown in FIG. 1.

The tag padding circuit is positioned as one function of the arithmetic unit E-ALU 230 and can be realized in the present embodiment by providing a circuit shown in FIG. 18 in the E-ALU 230. In FIG. 18, a data, in which the tag is to be padded, is supplied to the signal line 445; the upper 4 bits of the signal line 445 are supplied to a signal line 447; the lower 24 bits are supplied to a signal line 448; and the remaining bits are supplied to a signal line 446. The data to be padded is supplied to a signal line 432. Then, if the output 158 of the TL 152 is at "1" when the tag padding control signal 465 from the E-CTL 290 is at "1", i.e., the 8-bit tag occurs, the lower 24 bits of the signal line 445 are outputted to the lower 24 bits of an output 450, and the signal line 432 is connected to the upper 8 bits of the output 450. At this time, if the output 158 of the TL 152 is at "0", the lower 28 bits of the signal line 445 are outputted to the lower 28 bits of the output 450, and the lower 4 bits of the signal line 432 are outputted to the upper 4 bits of the output 450. If the tag padding control signal 465 is at "0", on the other hand, all the outputs 450 take "0".

Figure 19:
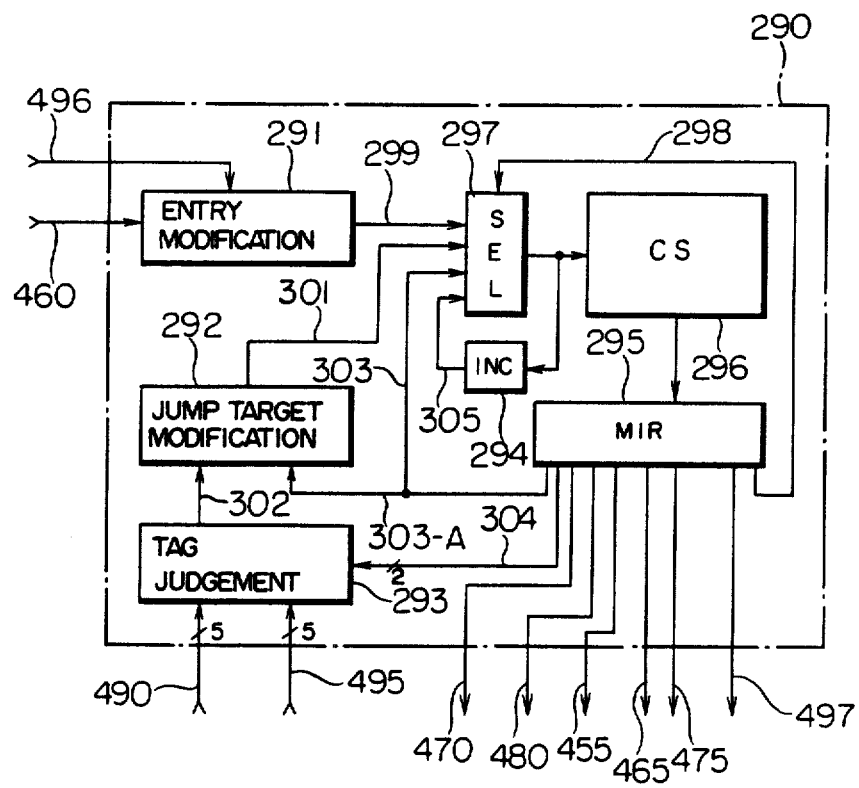
FIG. 19 is a block diagram showing the internal construction of a micro program control circuit shown in FIG. 1.

FIG. 19 shows the internal construction of the control circuit 290. The E-CTL 290 is a control circuit of micro program control type for generating a variety of control signals for executing instructions. The control circuit generally has more components and signal lines than those shown in FIG. 19, but they are not illustrated, having no direct relation to the present invention.

In FIG. 19, control memory (CS) 296 stores a micro program. The micro program read out of the CS 296 is latched in a micro instruction register (MIR) 295. A micro program address selector 297 selects an address of the control memory to be subsequently read out of signal lines 299, 301, 303 and 305 in accordance with the content of a signal line 298.

Figure 20:
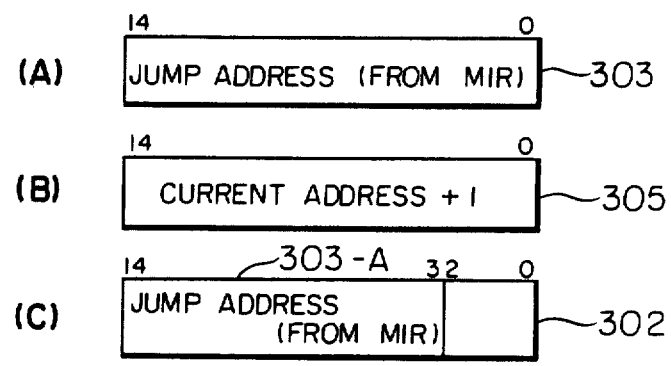
FIG. 20 illustrates at sections (A) through (C) various types of the addresses for the memory of the micro program controller.
Figure 21:
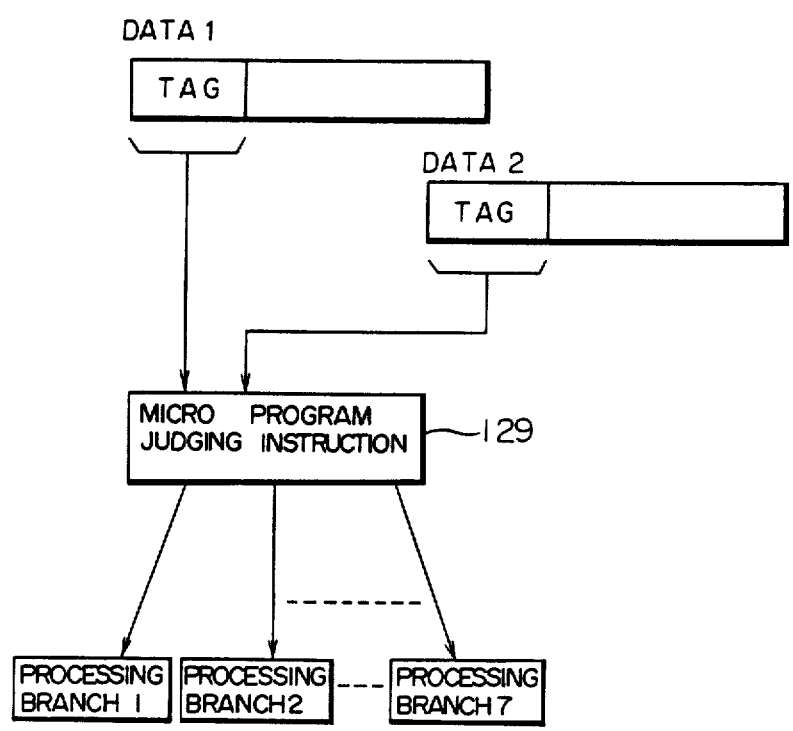
FIG. 21 is a block diagram for explaining the case in which the micro program is branched to the processings according to the tag judging results.

FIG. 20 shows at sections (A) through (C) respective types of the addresses to be selected in that way. Of these, what is shown at section (A) is a direct designation in which a branch address 303 contained in a micro instruction is used as the next read address of the memory, and what is shown at section (B) is a designation by an address increment, in which the present read address of the memory 296 is incremented by an incrementor 294 to the next read address 305 of the memory 296. At section (C) in FIG. 20 is shown an address 301 which is composed of a part 303-A of the branch address 303 and a jump address 302 from the outside and which is used as a read address. The conditional branching by the tags according to the present invention is conducted by renewing the read address of the memory 296 in accordance with the address type shown at (C) in FIG. 20. There is shown in FIG. 21 a behavior in which a tag is judged so that the micro program is branched to corresponding processings in accordance with the content of the tag being judged.

Figure 22:
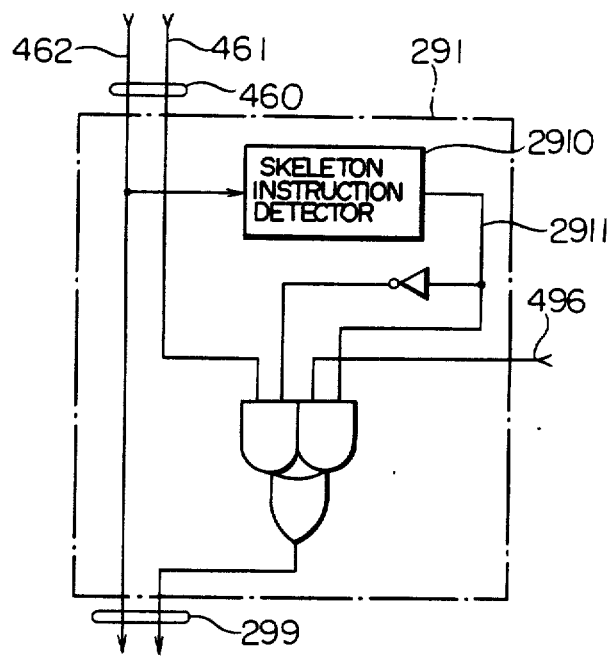
FIG. 22 is a circuit diagram showing one specific example of an entry modifying circuit shown in FIG. 1.

As will be understood from FIG. 21, in response to a micro instruction 129 having a mode for preparing the address type shown at (C) in FIG. 20, the judged result of the tag appears as a jump address 302 of 3 bits (0 to 2) so that such one of processings 0 to 7 as agrees with the judged result of the tag is executed by subsequently accessing the memory 296 in accordance with the addresses containing that jump address 302. More specifically, when the micro instruction 129 is read out of the memory 296 and set in the micro instruction register 295, the selector 297 is controlled by the signal 298 coming from the micro instruction register 295 so that the address 301 is selectively outputted from the selector 297. In the machine cycle subsequent to the execution of the micro instruction 129, the processing is made at one of the processings 0 to 7 in accordance with the value of the jump address 302 at the address 301 selected by the selector 297. An entry modifying circuit 291 is a circuit for modifying the entry address 460 of the E-CTL 290 in accordance with the value of the RMB 300 and can be constructed in the present embodiment by a circuit shown in FIG. 22. In FIG. 22, the lowermost bit of the entry address 460 is supplied to a signal line 461, whereas the remaining bits are supplied to a signal line 462. If the entry address of the instruction to be modified by the value of the RMB 300 is generated by the INSDEC 130, it is detected by a skeleton instruction detecting circuit 2910, and a signal line 2911 takes the value "1" so that the lowest bit of the address 299 to be first read out of the CS 296 provides the output 496 of the RMB 300. When the output of the skeleton instruction detecting circuit 2910 takes the value "0", on the other hand, the address 299 remains intact for delivery of the entry address 460. Although the lowermost bit is modified in the present embodiment, it is apparent that another bit can be modified.

In accordance with a test pattern 304 designated by the micro program, a tag judging circuit 293 generates an offset 302 for modifying the jump address 303 of the micro program by combining the outputs 490 and 495 of the tag registers. The tag judging circuit 293 can be constructed in the present embodiment by the logics having functions shown at (A) through (C) in FIG. 23. The logics shown in FIG. 23 can be easily realized by using the ROM (read only memory), the RAM (random access memory), the PLA (programmable logic array) and so on.

Figure 24:
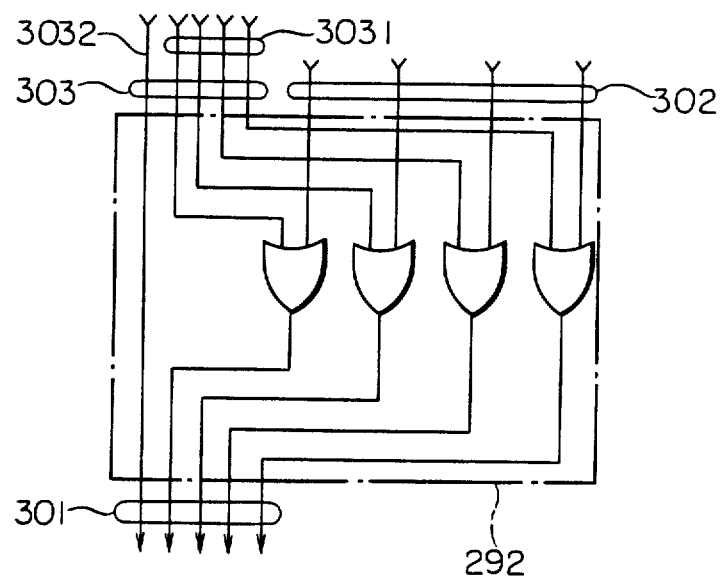
FIG. 24 is a circuit diagram showing the internal construction of a jump target modifying circuit shown in FIG. 1.

A jump target modifying circuit 292 is a circuit for generating a jump address which is spaced by a distance shown by the offset 302 on the basis of the jump address 303 designated by the micro program, and performs the so-called multi-way jump. The jump target modifying circuit 292 can be constructed in the present embodiment by a circuit shown in FIG. 24. In FIG. 24, a signal line 3031 indicates the lower 4 bits of the jump address 303, whereas a signal line 3032 indicates the remaining bits. A logical sum of the signal line 3031 and the offset 302 is outputted to the lower 4 bits of the jump address 301 at the output.

Next, examples of the operations for executing the tagless data instruction and the tagged data instruction will be described in the following.

(1) EXAMPLE OF EXECUTION OF TAGLESS DATA INSTRUCTION

A description of the example of the tagless data instruction will be given by taking up a load instruction. A load instruction shown at (a) in FIG. 25 is an instruction for transferring the data in an operand designated by an operand designator 1 to an operand designated by an operand designator 2, and an operation code is shown at (a) in FIG. 26. In the present embodiment, the addressing mode of the operand designator 1 is of 32-bit immediate type, and the addressing mode of the operand designator 2 is of register direct type.

The load instruction is read out of the MM 800 and stored in the form shown at (a) in FIG. 27 in the IBR 110. Then, the operation code and the mode designator are outputted by the aligner 120 to the signal line 350 (as shown at (b) in FIG. 27) and inputted to the instruction decoder INSDEC 130. The upper 9 bits of the operation code are inputted to the tagged data instruction detecting circuit 133, in which it is found to be a tagless data instruction so that the signal line 134 takes "0". In response to this, the E-CTL entry address generator 131 outputs the entry address of the tagless data instruction load to the signal line 460. In parallel with this, the A-CTL entry address generator 132 decodes the 32-bit immediate address mode to output the entry address therefor to the signal line 360.

The A-CTL 140 sets at "0" the signal 370 for controlling the SEP 160 and outputs the control signal necessary for the address computation, although not shown.

At this time, the 32-bit immediate data is outputted to the signal line 340 by the ALN 120 (as shown at (C) in FIG. 27). The tag-pointer separating circuit SEP 160 inputs that immediate data but outputs it as it is to the signal line 400 because the signal line 370 is at "0". The immediate data on the signal line 400 passes through the A-ALU 190 and is stored in the IMR 21, thus ending the address computation in the immediate addressing mode.

On the other hand, the E-CTL 290 reads out the micro program from the control memory CS 296 in accordance with the entry address of the load instruction inputted through the signal line 460 and generates the instruction executing control signal. Since, the load instruction is for the tagless data, however, the control lines 470, 480, 455, 475 and 465 for the respective tagged data circuits take the value "0". Thus, the immediate data in the IMR 210 passes through the data stubbing circuit MSK 240 and further through the E-ALU 230 until it is stored in the ERF 220, thus completing the load instruction.

(2) EXAMPLE OF EXECUTION OF TAGGED DATA INSTRUCTION

A description of the example of the tagged data instruction will be given by taking up a load constant instruction. An LCSTP instruction shown at (b) in FIG. 25 is an instruction for transferring a tagged data in an operand designated by an operand designator 210 to an operand designated by an operand designator 2, and an operation code is shown at (b) in FIG. 26. In response to the LCSTP instruction, only the first word is transferred when the tagged data is the type shown at (c) or (d) in FIG. 3. In the present embodiment, the addressing mode of the operand designator 1 is made extended immediate, and the addressing mode of the operand designator 2 is made register-direct.

Figure 28:
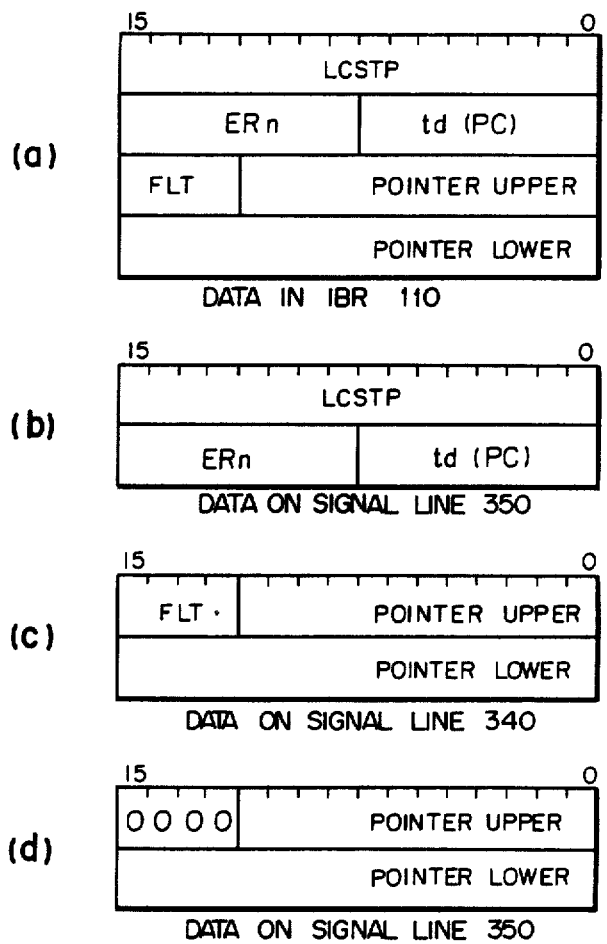
FIG. 28 illustrates at sections (a) through (d) the data occurring at various points useful for explaining the examples of executing the tagged data instructions according to the present invention.

The LCSTP instruction is read out of the MM 800 and stored in the form shown at (a) in FIG. 28 in the IBR 110. The operation code and the mode designator are then outputted (as shown at (b) in FIG. 28) to the signal line 350 by the aligner 120 and inputted to the instruction decoder INSDEC 130. The upper 9 bits of the operation code are inputted to the tagged data instruction detector 133, in which they are found to be the tagged data instruction, so that the signal line 134 takes the value "1". In response to this, the E-CTL entry address generator 131 outputs the entry address of the tagged data instruction LCSTP to the signal line 460. In parallel therewith, the A-CTL entry address generator 132 decodes that the mode is the extended immediate addressing mode, and judges that the addressing mode is correct, because the signal line 134 is at "1". Then, the entry address generator 140 outputs the entry address for the extended immediate addressing mode to the signal line 360. The A-CTL 140 sets the control signal 370 for the SEP 160 at "1" in accordance with the entry address on the signal line 360.

At this time, the tagged data of 32 bits is outputted to the signal line 340 by the ALN 120 (as shown at (c) in FIG. 28). Since the signal line 370 is at "1", the tag-pointer separating circuit SEP 160 inputs that tagged data and outputs the tag to the signal line 380 and the code-extended pointer to the signal line 400.

This pointer is added to the PC 170 at the A-ALU 190 by means of a control signal (not shown) coming from the A-CTL and stored in the IMR 210 and the MAR 310, thus ending the extended immediate address computation.

In accordance with the LCSTP instruction entry address inputted through the signal line 460, on the other hand, the E-CTL 290 reads out the micro program from the control memory CS 296 to generate the instruction executing control signals. For the LCSTP instruction, it is necessary to compose the tag in the TAG 200 and the pointer in the IMR 210 and to store a resultant data as the tagged data in the ERF 220. Therefore, the tag padding control signal 465 takes the value "1" so that the tag is padded in the E-ALU 230 and stored in the ERF, thus completing the LCSTP instruction.

Figure 29:
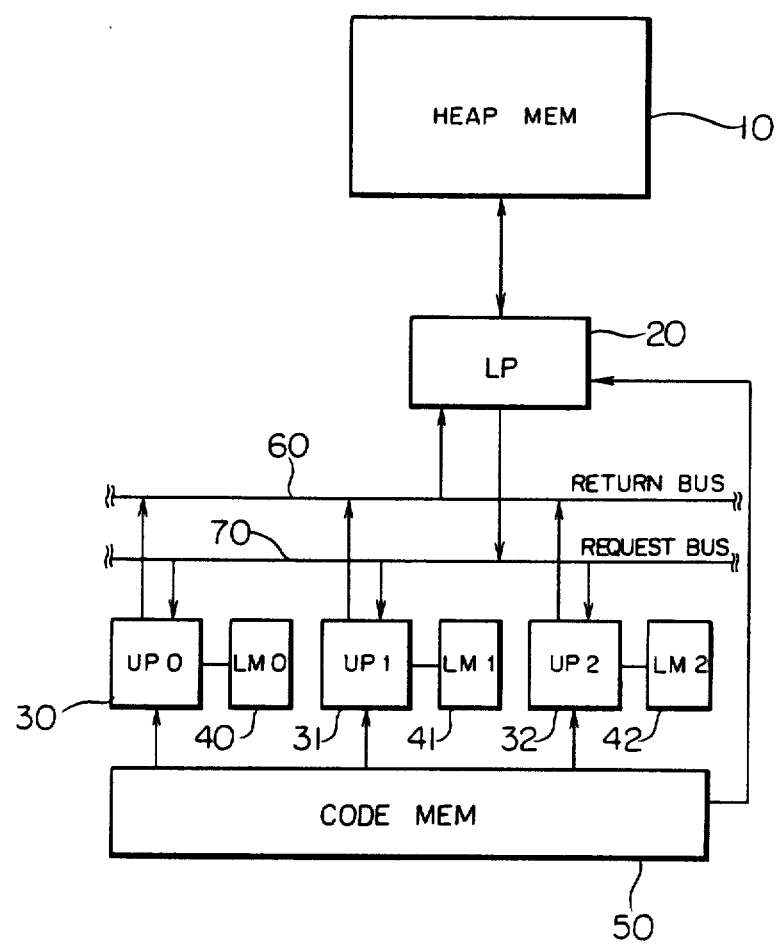
FIG. 29 is a block diagram showing an applied example of the present invention.

FIG. 29 shows an example of the construction of a computer which is suitable for processing at a high speed the program described in a logical type programming language such as prolog.

Figure 30:
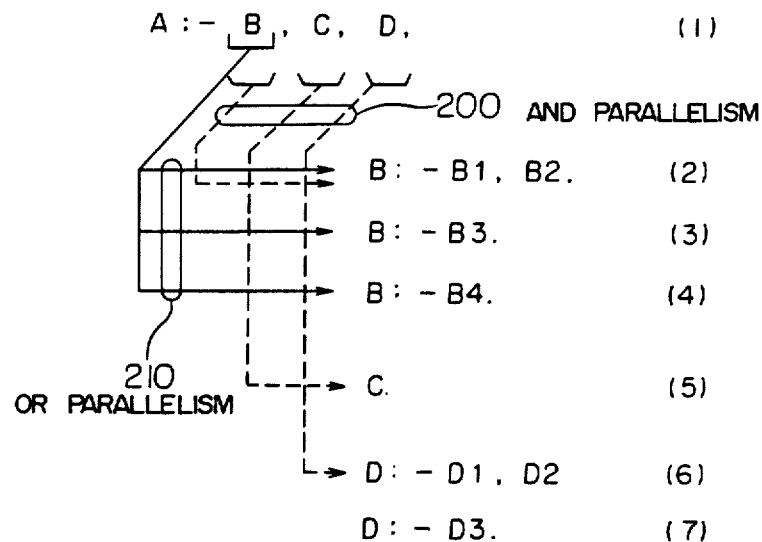
FIG. 30 is a diagram showing one example of the prolog used for explaining the operation of FIG. 29.

It is told that the programmings written in prolog contain a number of parallelisms and can be processed at a high speed by processing them in parallel at many computers. The parallel prolog processing method is roughly divided into the so-called "AND parallel" and "OR parallel" types. FIG. 30 shows these AND parallel and OR parallel types. At sections (1) to (7) in FIG. 30, there are shown respective statements (which will be called "clauses") of prolog. In this prolog, the right-hand side (which will be called a "head") of ":-" raises a condition for that the lefthand side (which will be called a "body") be true, and the respective terms (which will be called "goals") of the body raise the AND condition. It is the AND parallelism that examines simultaneously whether or not the goals of the body are true. In FIG. 30, it is necessary to examine whether the goals B, C and D are true or not.

On the other hand, there generally exist a plurality of probabilities whether or not the respective goals of the body are true. In FIG. 30, if any of the clauses (2), (3) and (4) is true, the goal B of the body of (1) becomes true. It is the OR parallelism that examines in that way whether or not the goals are true.

FIG. 29 shows a data processing system for the OR parallelism around the data processors 20, 30, 31 and 32 incorporating the present invention. A Heap Mem 10 is a work memory. A Code Mem 50 is a memory for storing instructions, in which the program of prolog is compiled at unit of clause and stored. The LP 20 is a data processor for executing an instruction of the goal portion of those instructions stored in the Code Mem 50. This data processor sets the arguments of the goals in the registers in the data processors UP0-30, UP1-31 and UP2-32 to start them. The data processors UP0-30, UP1-31 and UP2-32 are cooperative with the LP 20 for executing the instructions of the head portions of the respective instructions stored in the Code Mem 50 to unify the arguments of the goals set in registers 40, 41 and 42 (LM0, LM1 and LM2) and the arguments of the heads thereby to return the results through a return bus 60 to the LP 20.

Next, the operation when the prolog shown in FIG. 30 is executed by using the present embodiment will be described in the following.

In order to conduct the OR parallelism, the number of the UPs required is equal to the maximum number of the clauses having the same heads. In the present embodiment, however, only the three UPs, UP0 to UP2 (i.e., 30, 31 and 32), are shown because the same heads B are provided three in number.

The LP 20 reads out the argument of the goal B from the Heap Mem 10 and sets it simultaneously in the argument registers (40 to 42) of the UP0, UP1 and UP2 (30 to 32). In other words, the argument at the goal side is uniformly distributed to the UPs. Then, the address of the head of the clause (2) is transferred to the UP0-30, and the addresses of the heads of the clauses (3) and (4) are transferred to the UP1 and UP2, respectively, to start the respective UPs through a request bus 70. The UP0, UP1 and UP2 (30 to 32) start their unification simultaneously with but independently of one another to report the results to the LP 20 through the return bus 60. The LP 20 gives the top priority to the response coming from the clause which is first written on the program. If the unification of that clause (which corresponds to (2) of FIG. 30) succeeds, the setting of the arguments at the goal side and the starting of the UPs 30 to 32 are repeated by using the goal to be evaluated as the first goal (which corresponds to B1 in FIG. 30) of that clause so that the OR parallelism can be realized to execute the prolog at a high speed.

As described above, according to the present invention, in the computer in which the tagless data and the tagged data have he same word length, the instructions for the tagless and tagged data can be executed in the same instruction set, and an addressing mode equivalent to that of the tagless data instruction can also be given to the tagged data instruction. This means that even the program described in the tagged data instruction is relocatable. This provides an effect that the program for the intelligence engineering using the tagless and tagged data instruction in a mixed manner can be made more practical.

Further, according to the present invention, by storing the tag part of data in the tag part storing registers on the data bus, that tag can be judged, as necessary. This eliminates the overhead in which it is necessary to once transfer the data to the work file so that the tag may be latched and to read that data, as necessary. There can be attained another effect that the tag extension can be facilitated.

We claim:

1. A data processor for reading an instruction out of a memory unit storing basic data and instructions to execute the instruction, wherein said basic data is of a first data type comprised of only data and a second data comprised of a tag part which identifies a data type and a data part and wherein said first data type consists of data n bits ($n \geq 16$) and said second data type includes a first sub-data type consisting of a tag of k bits ($k < n$) and a data part of ($n - k$) bits excluding the tag and a second sub-data type consisting of a tag of l bits ($l < n$, $l \leq K$ and a data part of ($n - l$) bits excluding the tag, said data processor comprising:
   first decoder means for detecting whether the instruction read out of said memory unit is an instruction having the first data type as an operand or an instruction having the second data type as an operand;
   second decoder means, responsive to said first decoder means indicating that an operand of an instruction having the second data type as an operand is contained in an instruction word, for detecting whether the operand contained in the instruction word has the first sub-data type or the second sub-data type;
   means for separating the tag and the data part when the second sub-data type is detected by said second decoder means;
   tag storing means for storing the separated tag; and
   address computing means for using the data of the second sub-data type part for address computation.

2. A data processor as set forth in claim 1, wherein said second decoder means discriminates said first and second sub-data types by decoding a mode designator indicating the addressing mode contained in the instruction.

3. A data processor as set forth in claim 1, wherein said means for separating the tag and data part includes means for computing the length of said tag and means responsive to the computed length of said tag for separating said tag from other parts of said basic data.

4. A data processor according to claim 1, further comprising a unit for evaluating said tag part, and a micro program controller for multi-branching using a result of evaluation of said tag part, wherein said tag evaluating unit includes a tag separator for extracting said tag part from data on a data bus, a plurality of tag part storing registers for storing said tag part from said separator in response to a signal from said micro program controller, and a tag multi-way jump encoder for generating a tag multi-way jump address for said controller in response to the outputs of said registers and a signal coming from said micro program controller.

5. A data processor as set forth in claim 4, wherein said tag separator includes means for computing the length of said tag and means responsive to a computed tag length for extracting said tag part.

6. A data processor according to claim 1, further comprising:
   means responsive to a flag bit for latching execution results;
   decoder means for detecting the occurrence of a skeleton instruction; and
   means for modifying a micro program entry address of the skeleton instruction in response to said flag bit and an output of said decoder means.

7. A data processor for reading an instruction out of a memory unit storing basic data and instructions to execute the instruction, wherein said basic data is of a first data type comprised of only data and a second data type comprised of a tag part indicative of a data type and a data part, said data processor comprising: a unit for evaluating said tag part; and a micro program controller for multi-branching in accordance with the evaluation result of said tag part, wherein said tag evaluating unit includes: (a) a tag separator for extracting said tag part from data on a data bus: (b) a plurality of tag part storing registers for storing said tag part from said separator under the control of a signal from said micro program controller: (c) and a tag multi-way jump encoder for generating a tag multi-way jump address to feed it to said controller on the basis of the outputs of said registers and a signal coming from said micro program controller.

8. A data processor as set forth in claim 7, wherein said tag separator computes the length of said tag to extract said tag part in accordance with the computation result.

9. A data processor for reading an instruction out of a memory unit storing basic data and instructions to execute the instruction, wherein said basic data has a first data type comprised of only data and a second data type comprised of a tag part indicative of a data type and a data part and wherein an instruction having the second data type as an operand includes a skeleton instruction for different operations which depend on execution results of the preceding instruction, said data processor comprising:
   a flag bit for latching execution results;

decoder means for detecting the occurrence of a skeleton instruction; and means for modifying a micro program entry address of the skeleton instruction on the basis of output signals from said flag bit and said decoder means, thereby making operations by the skeleton instruction different.

10. A data process for processing operands in response to instructions, comprising:

a memory unit for storing operands and instructions, wherein each operand of a first data type comprises within a basic work length a tag of plural bits identifying a data type and a data part and each operand of a second data type is tagless, each instruction being composed of an op-code for designating whether or not an operand is of the first data type and for designating an operation and an operand specifier for specifying a location in said memory unit or a register where an operand is stored or which represents an operand;

first means for detecting whether or not an instruction fetched from said memory unit is an instruction for a first data type of operand by decoding the op-code of the instruction; and second means for processing the operand specified by the operand specifier as tagged data or tagless data in response to said first means.

11. A data processor as set forth in claim 10, wherein said operand specifier has a mode designator indicative of an addressing mode and a displacement, for use in address computation and at least one instruction has a displacement part composed of a tag part identifying a data type and an address part for address computation.

12. A data processor as set forth in claim 11, further including third means for detecting when a displacement includes a tag part identifying a data type and an address part for address computation by decoding the mode designator indicating an addressing mode and means responsive to said second detecting means for separating the tag part from the address part.

13. A data processor as set forth in claim 12, comprising tag storing means for storing a separated tag, address computation means for using the separated address part for performing address computation and for producing an operand and instruction execution means for processing the operand in accordance with the value of the tag stored in said tag storing means.

14. A data processor for processing operands in response to instructions, comprising:

a memory unit for storing operands and instructions, wherein each operand of a first data type comprises within a basic word length a tag of plural bits identifying a data type and a data part and each operand of a second data type is tagless, at least one operand of the second data type including floating data, each instruction being composed of an op-code for designating whether or not an operand is of the first data type and for designating an operation and an operand specifier for specifying a location in said memory unit or a register where an operand is stored or which represents an operand;

first means for detecting whether or not an instruction fetched from said memory unit is an instruction for a first data type of operand by decoding the op-code of the instruction; and means for processing the operand specified by the operand specifier as tagged data or tagless data in response to said first means.

15. A data processor for processing operands in response to instructions, comprising;

a memory unit for storing operands and instructions, wherein each operand of a first data type comprises within a basic word length a tag of plural bits identifying a data type and a data part and each operand of a second data type is tagless, at least one of the instructions being a floating instruction, each instruction being composed of an op-code for designating whether or not an operand is of the first data type and for designating an operation and an operand specifier for specifying a location in said memory unit or a register where an operand is stored or which represents an operand;

first means for detecting whether or not an instruction fetched from said memory unit is an instruction for a first data type of operand by decoding the op-code of the instruction; and means for processing the operand specified by the operand specifier as tagged data or tagless data in response to said first means.

16. A data processor for processing operands in response to instructions, comprising:

a memory unit for storing operands and instructions, wherein each operand of a first data type comprises within a basic word length a tag of plural bits identifying a data type and a data part and each operand of a second data type is tagless, each instruction being composed of an op-code for designating whether or not an operand is of the first data type and for designating an operation and an operand specifier for specifying a location in said memory unit or a register where an operand is stored or which represents an operand, at least one operand specifier being capable of byte-addressing;

first means for detecting whether or not an instruction fetched from said memory unit is an instruction for a first data type of operand by decoding the op-code of the instruction; and means for processing the operand specified by the operand specifier as tagged data or tagless data in response to said first means.

17. A data processor for processing operands in response to instructions, comprising:

a memory unit for storing operands and instructions, wherein each operand of a first data type comprises within a basic word length a tag of plural bits identifying a data type and a data part and each operand of a second data is tagless, at least one operand of the second data type including floating data and at least one of the instructions being a floating instruction, each instruction being composed of an op-code for designating whether or not an operand is of the first data type and for designating an operation and an operand specifier for specifying a location in said memory unit or a register where an operand is stored or which represents an operand, at least one operand specifier being capable of byte-addressing;

first means for detecting whether or not an instruction fetched from said memory unit is an instruction for a first data type of operand by decoding the op-code of the instruction; and means for processing the operand specified by the operand specifier as tagged data or tagless data in response to said first means.

18. A data processor for processing operands in response to instructions stored in a memory unit wherein each operand of a first data type comprises within a basic word length a tag of plural bits identifying a data type and a data part and each operand of a second data type is tagless, each instruction being composed of an op-code for designating whether or not an operand is of the first data type and for designating an operation and an operand specifier for specifying a location in said memory unit or a register where an operand is stored or which represents an operand, said data processor comprising:

first means for detecting whether or not an instruction fetched from said memory unit is an instruction for a first data type of operand by decoding the op-code of the instruction; and second means for processing the operand specified by the operand specifier as tagged data or tagless data in response to said first means, including means for performing an operation on an operand of first data type as indicated by said op-code and said tag of plural bits.

19. A data processor according to claim 18, wherein at least one operand of the second data type includes floating data.

20. A data processor according to claim 19, wherein at least one of the instructions is a floating instruction.

21. A data processor according to claim 20, wherein at least one operand specifier is capable of byte-addressing.

* * * * *